United States Patent [19]

Smith

[11] 4,101,001

[45] Jul. 18, 1978

[54] DUAL TIMER WITH DELAY

[75] Inventor: Carl H. Smith, Spring Valley, N.Y.

[73] Assignee: Auto Research Corporation, Oakland, N.J.

[21] Appl. No.: 691,615

[22] Filed: Jun. 1, 1976

[51] Int. Cl.$^2$ ............................................. F01M 1/18
[52] U.S. Cl. ................................... 184/6.4; 340/626; 307/293
[58] Field of Search ................ 184/1 C, 64, 7 D, 7 E, 184/7 F; 340/270; 307/293

[56] References Cited

U.S. PATENT DOCUMENTS 3,381,776   5/1968   Gruber et al. ........................ 184/6.4

*Primary Examiner*—Samuel Feinberg
*Attorney, Agent, or Firm*—Ostrolenk, Faber, Gerb & Soffen

[57] ABSTRACT

A solid state dual timer with adjustable "long" and "short" time intervals preferably providing a long normally operating period between consecutive test periods which are utilized for test purposes, wherein a "delay" interval is provided at the initiation of each test period to allow the test conditions being imposed a sufficient time to settle. A highly advantageous application resides in the field of automated lubrication systems in which periodic pressure tests to monitor system integrity are performed, for example, every hour, the tests requiring a relatively brief time interval, the "delay" interval being of a length sufficient to allow the system pressure to build up before the test instruments are activated. The normally operating interval and the test and "delay" periods are all adjustable.

17 Claims, 2 Drawing Figures

DUAL TIMER WITH DELAY

The present invention relates to timers and more particularly to a novel solid state dual timer with a capability of providing a "delay" interval at the initiation of each test period interval and especially adapted for use, for example, in monitoring a cyclic fluid pressure condition.

BACKGROUND OF THE INVENTION

In one type of lubricating system it is conventional to provide a continuously operating lubricating pumping apparatus which feeds lubricant at a constant but controlled rate. The pressurized lubricant is metered to provide a measured flow at each lubricant outlet to the equipment to be lubricated. The measured flow may be quite different at each outlet. A pump is operated to develop sufficient pressure to feed lubricant in measured amounts to all of the equipment being serviced by the lubricator. Since, in many cases, the flow rate may be typically quite low (for example, one or two drops of lubricant per hour) the integrity of the system may be quite difficult to ascertain. One suitable method is to build up the pressure in the system to a very high level for a brief period of time and sense the pressure level and hence the integrity of the system, at critical points in the system once the test pressure is achieved.

Since the metering of the flow of lubricant is adjusted to provide lubricating fluids at a continuous rate, the pressurizing pump should preferably be tested periodically to be assured that the pump is, in fact, operating properly and that the conduits leading away from the pump are failurefree since termination of the flow of adequate lubricant due to either breaks or blockages may result in over heating and even severe damage to the equipment requiring lubricant. Although constant checking is required, the tests need not be performed more often than once every several hours, thereby requiring the use of means which is capable of developing time delays which are of the order of hours.

One technique for determining whether the system for dispensing lubricant is operating properly utilizes a pressure sensing device for sensing system pressure after each periodic build-up of liquid pressure. Such devices are employed with a timing device for generating a time interval that is of the order of several hours between successive testing operations. An indicator device is connected with the pressure sensing device to indicate an under pressure condition due to a malfunction in the system. Such prior art devices are quite expensive since they require a pressure sensing device, a complex and expensive timer and complex and expensive recycling means.

Also, it is extremely undesirable to take a pressure reading at the very initiation of the test period since the test being imposed and the test device, meter, switch, or the like, as well as the test conditions imposed, require a predetermined time to "settle" before reaching a steady state condition at which a proper reading can be taken.

BRIEF DESCRIPTION OF THE INVENTION

The present invention is characterized by providing an adjustable all solid state electronic dual timer with a "delay" time interval capable of carrying out all of the above advantageous features in a regular and reliable manner.

The present invention is comprised of a first solid state timer which generates a "long" adjustable time delay usually of the order of a fraction of one hour to several hours. At the termination of the time interval, first and second adjustable "short" time interval circuits are simultaneously activated, each to respectively begin the time-out of first and second "short" time durations where one of the "short" time durations is shorter than the other.

The shorter time duration is utilized as the "delay" time interval to energize and/or connect the sensing means, impose the test conditions and allow sufficient time for the pressure to build to the test level and to "settle" at the test level before any readings are taken or before any automatic operations occur responsive to a condition of the sensing means.

As soon as the first short time interval terminates, the test conditions have settled and the sensing means, which have now been activated, are enabled to apply their sensed condition to output utilization means during the time in which the first short time period is terminated and the second short time period is still timing out.

Manually actuable means are provided for performing a test at any time independently of the long adjustable time means and without in any way altering or affecting the time intervals of the "long" duration timer means. Also, a stop switch and a manual switch are respectively provided for deactivating the circuitry and for initiating a manual test when desired.

The functions provided by the first and second adjustable short timing means are provided in both their true and complementary forms to render the circuitry more versatile, for the above, as well as other applications.

OBJECTS AND BRIEF DESCRIPTION OF THE FIGURES

It is therefore one object of the present invention to provide novel dual timing means of a solid state design in which certain functions are permitted to occur within an adjustable test interval usually of the order of minutes or tens of minutes, each test interval being initiated at periodic intervals usually of the order of from ⅓ of an hour to at least several hours, and wherein a "delay" interval is provided at the initiation of the test interval to assure the fact that all test circuits and/or test conditions being imposed have "settled" before any sensing operations are permitted to occur.

The above as well as other objects of the present invention will become apparent when reading the accompanying description and drawings in which:

FIG. 1 is a schematic showing a solid state circuit designed in accordance with the principles of the present invention; and FIG. 2 is a block diagram showing the "short" interval timers of FIG. 1 in greater detail.

DETAILED DESCRIPTION OF THE INVENTION

Figure 1:
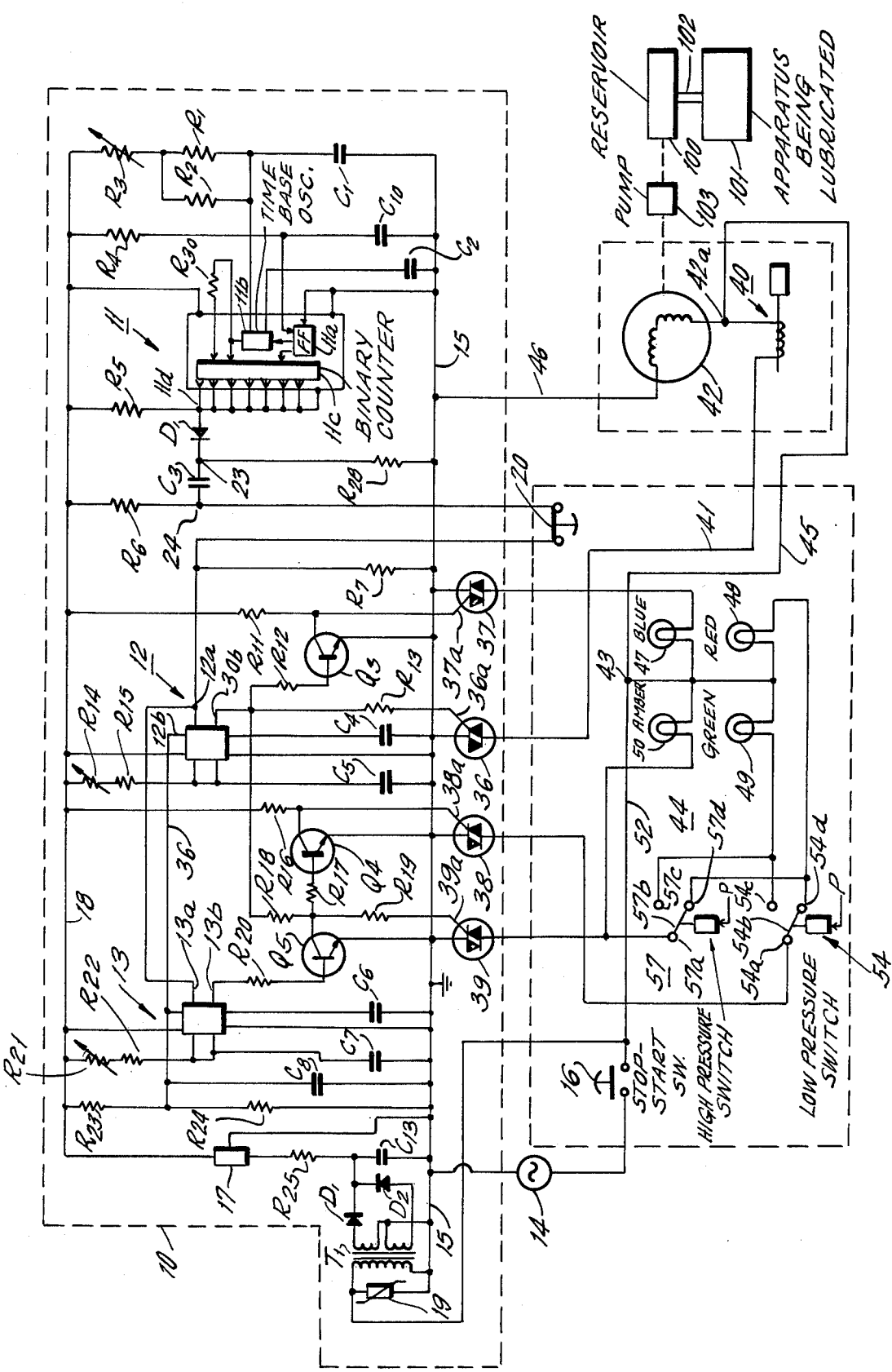

FIG. 1 shows a solid state circuit 10 for achieving all of the functions of the present invention and which is comprised of a first solid state adjustable "long" interval timer circuit 11 and first and second solid state adjustable "short" interval timer circuits 12 and 13 respectively.

A power source 14 is coupled between ground bus 15 and a stop/start switch 16. When closed, the switch 16 couples power source 14 across the primary winding of transformer $T_1$. Varistor 19 is coupled across the primary windings of transformer $T_1$ to protect the circuit from overvoltage spikes which may occur in the power line. The secondary winding is coupled to a fullwave bridge circuit comprised of diodes $D_1$ and $D_2$ to provide fullwave rectification of the input a.c. signal. Capacitor $C_{13}$ and voltage regulator circuit 17 serve to provide a regulated voltage between ground bus 15 and bus 18. The voltage regulator 17 may be of any suitable type, one satisfactory solid state circuit being the Fairchild Model UA78L00 series.

The regulated d.c. level is coupled across the adjustable "short" interval timer circuits 12 and 13 and adjustable "long" interval timer circuit 11. Circuit 11 is comprised of a control flip-flop 11a, time base (i.e. oscillator) circuit 11b and binary counter 11c. This circuit may, for example, be the EXAR, Integrated Systems, programmable timer/counter circuit Model XR 2240. The manner of operation is such that the control flip-flop 11a, when triggered "On", enables the time base circuit 11b which, for example, is an oscillator means, to apply pulses to the input of binary counter 11c which accumulates the pulses. The time base of the oscillator 11d is determined by fixed resistors $R_1$ and $R_2$, adjustable resistor $R_3$ and capacitor $C_1$. Resistor $R_4$ and capacitor $C_{10}$, applied to the trigger input of the bistable flip-flop 11a, when the circuit is powered up, delays the application of a trigger level until all the circuits in the timer 11 have been properly reset. The delay occuring on power-up is preferably of the order of one second, allowing the timer circuit 11 to initialize and further allowing capacitor $C_1$ to be fully charged.

The pulse rate of the time base oscillator 11b is determined by the R-C timing circuit described hereinabove and includes resistors $R_1$, $R_2$ and $R_3$ and capacitor $C_1$. The pulses accumulated by the binary counter 11c and delivered thereto by the time base oscillator 11b cause outputs of selected stages of the binary counter to go high at predetermined time intervals. Depending upon the combination of the output terminals coupled to bus 18 by resistor $R_5$, the output terminal 11d will go high upon reaching that count (i.e. when all counter outputs connected to 11d are "high") to simultaneously apply a positive-going trigger pulse to terminal 23 of capacitor $C_3$ and through normally closed manual test switch 20 to the inputs 12a and 13a of first and second short timers 12 and 13 respectively. Output terminal 11d will subsequently go low when the first counter output connected thereto goes low simultaneously applying a negativegoing trigger pulse to terminal 23 of capacitor $C_3$ and through normally closed manual test switch 20 to the inputs 12a and 13a of first and second "short" interval timers 12 and 13, respectively.

Presuming a binary counter having eight stages, any count from 1-256 is obtainable and, depending upon the choice of values for $R_1$-$R_3$ and $C_1$, a wide range of time intervals is selectable. In one example, the time range was set between 2/10 of an hour and 3.7 hours. By removing resistor $R_1$ in the above example, the time period was changed to a range from 2.2 to 5.7 hours. When all of the outputs of the stages of binary counter 11c are coupled to common terminal 11d, thereby providing a count of 256, the counter counts up to 255 and switches. The integrated circuit timers 12 and 13 get triggered on the falling edge and hence are triggered after the 256th time interval, i.e. when terminal 11d returns to ground on the 256th pulse developed by the time base oscillator 11b.

The adjustable timing circuits 12 and 13 trigger on the 256th pulse. At the 255th pulse, output terminal 11d goes high establishing a high level at the common terminal 23 between diode $D_1$ and capacitor $C_3$. At the 256th pulse, and since the voltage across a capacitor cannot change instantaneously, when the voltage level drops at terminal 11d, an abrupt drop occurs at terminal 24, simultaneously applying a negative-going level through manual test switch 20 to inputs 12a and 13a.

Figure 2:
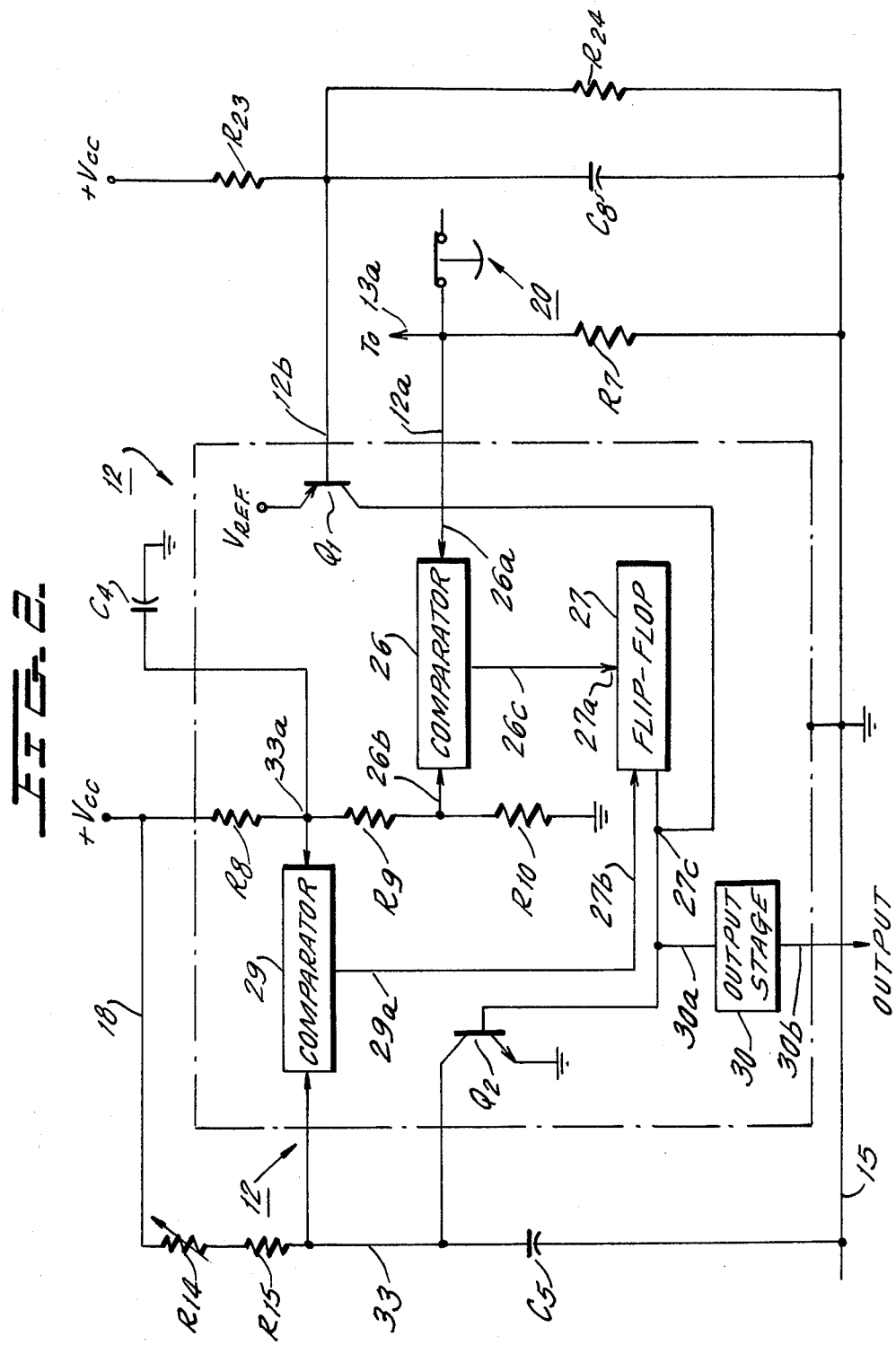

FIG. 2 shows a more detailed arrangement of the timer 12 (timer 13 being substantially identical thereto) which is comprised of input terminal 12a coupled in common between manual test switch 20 and resistor $R_7$ which is coupled to ground bus 15. The trigger level is applied to one input of comparator 26 which compares the input level applied at 26a against the level applied to input 26b, which level is determined by the voltage divider comprised of resistors $R_8$, $R_9$ and $R_{10}$. The output 26c of comparator 26 is coupled to one control input 27a of bistable flip-flop 27 whose other control input 27b is coupled to output 29a of comparator 29 and whose output 27c is simultaneously coupled to the input 30a of output stage 30, the base electrode of transistor $Q_2$ and the collector of transistor $Q_1$. The collector of $Q_2$ is coupled to the common terminal between resistor $R_{15}$ and capacitor $C_5$. $R_{15}$ is coupled to the positive bus 18 through adjustable resistor $R_{14}$. Comparator 29 compares the voltage at the common terminal 33 between $R_{15}$ and $C_5$ against the reference level appearing at the common terminal 33a between $R_8$ and $R_9$.

In operation, capacitor $C_3$ is charged when the timing cycle for adjustable timing circuit 12 is in the "Off" phase. Diode $D_1$ prevents the approximately 8.1 volt d.c. level at terminal 23 from being fed back to the "long" interval timer circuit 11.

Capacitor $C_3$ couples a negative going pulse to the trigger input 12a, as well as the input 13a on the 265th count.

Neither of the circuits 12a or 13a will turn "On" on an initial "power up" of the system. Reset input terminals 12b and 13b (connected to terminal 12b by conductor 36) are maintained at a low voltage level by capacitor $C_8$ during power-up (FIG. 1). Resistors $R_{23}$ and $R_{24}$ cooperate with capacitor $C_8$ to allow the circuits 12 and 13 to be initialized and start with an "Off" period initially. $Q_1$ initially maintains $Q_2$ "On" to short-circuit $C_5$ to ground bus 15. If desired, capacitor $C_8$, resistor $R_{23}$ and $R_{24}$ may be removed enabling the device to start with an "On" period.

During the "long" time interval, outputs 30b and 13b of circuits 12 and 13 respectively are low. The low level at output 30b, connected through $R_{12}$ to the base electrode of transistor $Q_3$, renders $Q_3$ non-conductive and allows triac 37 to be turned "On" by the voltage level of bus 18 coupled through resistor $R_{11}$ to gate electrode 37a of triac 37. The remaining terminals of triac 37 are coupled between ground bus 15 and one terminal of "blue" lamp 47. The remaining terminal of lamp 47, as is one terminal of each of the lamps 47-50 of the lamp group, is connected to a common terminal 43 which is coupled to one terminal of a.c. source 14 through stop/start switch 16 and conductor 52.

Output terminal 30b is also simultaneously coupled to gate electrode 36a of triac 36 through resistor $R_{13}$. The low level applied thereto turns "Off" triac 36 having its output terminals respectively coupled between ground bus 15 and one terminal of solenoid 40 (through lead 41). The opposite terminal of solenoid 40 is coupled to terminal 42a and to a common terminal 43 of lamp array 44 (through conductor 45). The opposite terminal of motor 42 is coupled through lead 46 to ground bus 15. Motor 42 pumps lubricant from reservoir 100 to the apparatus 101 being lubricated by way of conduit 102.

Output terminal 30b is also simultaneously coupled to the gate electrode 39a of triac 39 through resistors $R_{18}$ and $R_{19}$. The low level applied thereto turns "Off" triac 39 having its output terminals respectively coupled between ground bus 15 and one terminal of "amber" lamp 50 whose remaining terminal is connected to common terminal 43. The output terminal of triac 39 not connected to ground bus 15 is also connected to switch arm 57a of high pressure switch 57.

Output terminal 30b is also coupled to the base electrode of transistor $Q_4$ through resistors $R_{18}$ and $R_{17}$. The low level applied thereto renders $Q_4$ non-conductive and allows triac 38 to be turned "On" by the voltage level of bus 18 coupled through resistor $R_{16}$ to gate electrode 38a of triac 38. The remaining terminals of triac 38 are coupled between ground bus 15 and switch arm 54a of low pressure switch 54.

As described hereinabove, during the "long" timing interval triacs 37 and 38 are "On" and triacs 36 and 39 are "Off". Triac 37 completes an electrical path from ground bus 15 through conducting triac 37, "blue" light 47, common terminal 43, lead 52, closed switch 16 and voltage source 14. The illumination of the "blue" light indicates that the "long" time interval has not yet timed out.

With triacs 39 and 38 "Off" and "On" respectively, triac 38 completes an electrical path from ground bus 15 to the common terminal 54a of low pressure switch 54. Adjustable low pressure switch 54 is designed to have its switch arm 54b engage stationary contact 54c when the pressure P in the line being monitored is above a predetermined adjustable threshold level (typically in the range of b 20–200 psi). In the event that the pressure P drops below the preset level, switch arm 54b engages stationary contact 54d. Assuming that the pressure is normal, the circuit path extends from common bus 15 through conducting triac 38, switch arm 54b, contact 54c, "green" lamp 49, common terminal 43, lead 52, closed switch 16 and voltage source 14. The illumination of the "green" lamp indicates a normal condition. Assuming the pressure drops below the preset level, for example, switch arm 54b engages contact 54d coupling the "red" lamp 48 into the active circuit path and decoupling the "green" lamp 49.

Upon the initiation of the negative level applied to input 26a of comparator 26, the output 26c of comparator 26 sets flip-flop 27 so that its output 27c goes low thereby rendering $Q_2$ non-conductive and enabling $C_5$ to begin charging and causing the output stage 30 to develop a high level at its output 30b. The R-C timing circuit comprised of $R_{14}$, $R_{15}$ and $C_5$ determines the test duration period. As soon as terminal 33 reaches the preset threshold established by resistors $R_8$, $R_9$ and $R_{10}$, the output 29a of comparator 29 resets bistable flip-flop 27 causing transistor $Q_2$ to be rendered conductive to discharge $C_5$ and causing the output stage 30 to return to a low level at its output 30b.

When output 30b goes high, this condition is applied to the gate electrode 36a of triac 36 turning triac 36 "On".

Output 30b is also coupled through resistor $R_{12}$ to the base electrode of transistor $Q_3$. The high level applied thereto causes transistor $Q_3$ to conduct thereby driving its collector substantially to ground to turn "Off" triac 37 through its gate electrode 37a coupled to the collector of $Q_3$.

As described hereinabove in connection with timing circuit 12, timing circuit 13 also has its input 13a triggered on a negative going level causing its output 13b to go high. This high level is inverted by transistor $Q_5$ coupled to function as an inverter. The low level at the collector of $Q_5$ is coupled through $R_{17}$ to the base of $Q_4$ causing the collector of $Q_4$ to go high. Thus, the low level at the collector of $Q_5$ keeps triac 39 "Off" while the high level at the $Q_4$ collector keeps triac 38 "On" upon the initiation of the test interval. The timing circuit elements comprised of adjustable resistor $R_{21}$, fixed resistor $R_{22}$ and capacitor $C_7$ are selected to provide a "short" time interval which is shorter than the "short" time interval established by the R-C timing elements $C_5$, $R_{14}$, and $R_{15}$ employed in conjunction with the solid state timer circuit 12.

With triacs 39 and 38 "Off" and "On" respectively during the "delay" portion of the test period, by connections described hereinabove the position of the switch arm 54b of low pressure switch 54 is indicated by the illumination of "green" lamp 49 or "red" lamp 48.

Timer 12 is preferably set to provide a test interval period which is in the range from the order of one minute to of the order of six minutes. Timer 13 controls the time delay to prevent premature machine shutdown and/or erroneous under-pressure readings and its range is usually of the order of from five seconds to five minutes.

The initiation of the test interval energizes solenoid 40 which closes a by-pass or bleeder valve allowing the pump 103 operated by motor 40 to build the system pressure up to 300 psi (for example) to perform a system integrity test. The build-up typically requires several seconds to several minutes depending on the operating characteristics of the entire lubricating system. Thus, when timer 13 has timed out, its output 13b goes low rendering $Q_5$ non-conductive and allowing the high level of output 30b connected to gate electrode 39a of triac 39 through resistors $R_{18}$ and $R_{19}$ to turn triac 39 "On". The high level of output 30b, connected to the base electrode of $Q_4$ through $R_{18}$ and $R_{17}$, is allowed to render $Q_4$ conductive causing its collector to go low. The low level at the collector $Q_4$ connected to the gate electrode 38a of triac 38 turns triac 38 "Off". Triac 38, therefore, selectively removes the low pressure switch 54 from the active circuit while triac 39 selectively couples the switch arm 57a of high pressure switch 57 to ground bus 15. The high pressure switch senses the pressure P in the line being monitored and switch arm 57b normally engages contact 57c when the pressure is below 250 psi (which level is adjustable to suit the needs of the particular application). Under these circumstances, a circuit path is established from ground bus 15 through triac 39, switch arm 57b, contact 57c, "green" lamp 49, common terminal 43, closed switch 16 and a.c. source 14. At the same time, the "amber" lamp 50 will be illuminated, lamp 50 indicating that a test interval is in progress and that the "delay" interval has timed out.

"Amber" lamp 50 remains "Off" during the initial "delay" time portion of the test interval, when triac 39 is non-conductive, and turns "On" to indicate that the "delay" portion of the test interval has been terminated.

When the timing circuit 12 times out, the output 30b goes low turning triac 36 "Off". Q₃, as was mentioned hereinabove, operates as an inverter circuit causing the control level applied to input 37a of triac 37 to go high, turning triac 37 "On" to energize "blue" lamp 47 which provides an indication that the test period is terminated and that the "long" time interval is underway.

Triac 37, having been turned "Off" at the end of the test interval, decouples solenoid 40 from ground bus 15. The solenoid, when energized, allows the system pressure to build to 300 psi test pressure level required during the test interval, for example, by closing a bleeder valve. The first "delay" portion of the test interval, established by the timing circuit 13 assures that sufficient time is provided to allow build-up to at least the 300 psi level before the high pressure test is initiated. When the test interval is terminated, solenoid 40 is deenergized allowing the excess pressure to "bleed" out of the now open bleeder valve. The lubrication system then returns to its normal operating pressure.

Thus, summarizing the above operation, during the "long" time interval (established by timing circuit 11) between successive test intervals (established by timing circuit 12) "blue" light 47 is "On" indicating that the long time interval has not yet timed out. During the "non" test interval, triac 36 is "Off" and solenoid 40 is deenergized. At this time, the output 30b of timer 12 is low causing the output of triac 39 to be low and causing the output of triac 38 to be high (through the inverter action of Q₄). Thus when the system is between test intervals, the low pressure switch 54 remains in the circuit providing either a "red" lamp indication by illuminating lamp 48 which indicates the failure of either the lubrication or the test system; or the "green" lamp is lit indicating the correct operation of either the lubrication or the test system (or both). The "blue" light 47 goes out whenever the test period has begun and the "amber" light 50 is lit after the first or "delay" portion thereof has timed out.

It can thus be seen from the above description that the novel duel timer circuitry, together with an adjustable "delay" interval capability, provides the ability to continuously monitor one condition on a device and also periodically to perform a test on the device and to allow the test conditions being imposed to reach a steady state condition before the second conditions and/or points to be monitored are sensed.

Assuming that a test is desired at other than a normal test interval, manual test switch 20 is depressed disconnecting output terminal 24 from the inputs 12a and 13a of timing circuits 12 and 13 and simultaneously coupling these inputs to ground bus 15 through resistor R₇. This causes a negative going level to be applied to these circuits initiating a "test" interval. Diode D₁ prevents the positive going level change occurring at terminal 24 from being fed back to "long" timer 11 thereby preventing any change whatsoever in the cycling rate of timer 11.

Although there has been described a preferred embodiment of this novel invention, many variations and modifications will now be apparent to those skilled in the art. Therefore, this invention is to be limited, not by the specific disclosure herein, but only by the appending claims.

What is claimed is:

1. System testing apparatus, comprising:
   first adjustable time delay means for establishing the frequency at which a test condition is imposed on a system being tested, said first time delay means to generate a test initiating signal at adjustably preset first timing intervals;
   second adjustable time delay means responsive to said test initiating signal for establishing a testing interval during which a test condition is imposed on said system being tested, said testing interval being of a significantly shorter duration than said first timing interval;
   means controlled by said second adjustable time delay means for imposing a test condition on said system being tested during said testing intervals;
   third adjustable time delay means responsive to said test initiating signal for establishing a third timing interval of a shorter duration than said testing interval, said third timing interval being of sufficient duration to permit said test condition imposed by said means for imposing a test condition to "settle";
   means controlled by said second and third time delay means for coupling a condition sensing means, to said system being tested after the termination of said third timing interval but before the termination of said testing interval.

2. The system of claim 1, wherein said testing interval is less than one-half the duration of said first timing intervals established by said first time delay means.

3. The system of claim 1, wherein said first timing means is adjustable to provide first time delay intervals in the range from one-quarter hour to several hours.

4. The device of claim 3, wherein said testing interval is selected by making said second time delay means adjustable to provide a time interval which is of the order of from one-half minute to eight minutes.

5. The device of claim 4, wherein said third time delay means is adjustable to provide a third timing interval which is of the order of from five seconds to five minutes.

6. The device of claim 1, wherein said system being monitored is comprised of a lubricating system and wherein said means for imposing a test condition comprises means for abruptly building the pressure within said lubricating system responsive to the initiation of said testing interval established by said second time delay means.

7. The device of claim 6, wherein said condition sensing means comprises a high pressure responsive switch for sensing the pressure condition in the lubricating system after the termination of said third timing period but before the termination of said testing period and wherein said means for coupling a condition sensing means couples said high pressure switch into said system being tested only after the termination of said third timing period but before the termination of said testing period thereby allowing sufficient time for the pressure built up within the lubricating system to reach a steady state condition.

8. The device of claim 6, wherein said first, second and third time delay means are all comprised of adjustable R-C timing circuits.

9. The device of claim 8, wherein said first time delay means comprises:
   adjustable oscillator means for generating timing pulses having a desired frequency;
   a multistage counter means coupled to said oscillator means for counting said timing pulses;
   means for generating said test initiating signal when the count in said counter means reaches a predetermined value whereby the frequency of said test initiating signals is controlled by the frequency of said oscillator means; and means for resetting the count in said counter means each time said means for generating said test initiation signal generates said test initiation signal.

10. The device of claim 9 wherein each of said second and third time delay means comprise:

an R-C timing circuit;

means for charging said timing circuit in response to said test initiating signal;

means for generating an output signal when said R-C timing circuit charges to a predetermined value such that the time delay between the generation of the test initiating signal and said output signal is determined by said predetermined value; and means for adjusting said predetermined value.

11. The device of claim 10 further including second means controlled by said second and third time delay means for coupling a second condition sensing means to said system being tested during the time interval that said first means for coupling said first sensing means to said system being tested does not connect said first condition sensing means to said system being tested.

12. The device of claim 11 further comprising lamp means coupled to said first sensing means for indicating whether the condition being sensed by said first sensing means is above or below a predetermined threshold value.

13. The device of claim 12 wherein said lamp means is also coupled to said second sensing means and also indicates whether the condition being sensed by said second sensing means is above or below a second predetermined threshold value.

14. The device of claim 11 further comprising means responsive to said first and second means for deactivating said system being monitored when one of the conditions being monitored is below the predetermined threshold for whichever sensing means is activated.

15. The device of claim 1 further including second means controlled by said second and third time delay means for coupling a second condition sensing means to said system being tested during the time interval that said first mens for coupling said first sensing means to said system being tested does not connect said first condition sensing means to said system being tested.

16. The device of claim 15 wherein said second condition sensing means senses a different condition than said first condition sensing means.

17. The device of claim 15 wherein said second condition sensing means senses a different level of the same condition sensed by said first condition sensing means.

* * * * *